United States Patent [19]
Butterworth

[11] Patent Number: 6,139,174
[45] Date of Patent: Oct. 31, 2000

[54] LIGHT SOURCE ASSEMBLY FOR SCANNING DEVICES UTILIZING LIGHT EMITTING DIODES

[75] Inventor: Mark M. Butterworth, Santa Clara, Calif.

[73] Assignee: Hewlett-Packard Company, Palo Alto, Calif.

[21] Appl. No.: 09/139,904

[22] Filed: Aug. 25, 1998

[51] Int. Cl.$^7$ .................................. F21V 7/04; H01L 3/00
[52] U.S. Cl. ............................ 362/555; 362/84; 362/260; 362/231; 362/582; 362/551
[58] Field of Search .............................. 362/84, 260, 551, 362/555, 582, 230, 231

[56] References Cited

U.S. PATENT DOCUMENTS

| | | | |
|---|---|---|---|
| 2,713,629 | 7/1955 | Etzkorn | 362/84 |
| 3,635,832 | 1/1972 | Toney | 252/301 |
| 4,733,332 | 3/1988 | Yamashita et al. | 362/32 |
| 4,779,166 | 10/1988 | Tanaka et al. | 362/31 |
| 4,888,635 | 12/1989 | Harada et al. | 358/75 |
| 4,924,357 | 5/1990 | Yamashita et al. | 362/32 |
| 5,128,846 | 7/1992 | Mills et al. | 362/224 |
| 5,257,340 | 10/1993 | Kaplan | 385/128 |
| 5,747,832 | 5/1998 | Nakamura et al. | 257/103 |
| 5,753,906 | 5/1998 | Gennetten | 250/226 |
| 5,803,579 | 9/1998 | Turnbull et al. | 362/800 |

Primary Examiner—Sandra O'Shea
Assistant Examiner—Ali Alavi

[57] ABSTRACT

A light source assembly and method of providing illumination a target surface utilize a fluorescent material to generate composite "white" light from source light of a particular color, i.e., a particular wavelength. The light source assembly is optimally designed for use in scanning devices, such as flat-bed color scanners, in which linear illumination is necessary to capture images, graphics, and/or text from a target scanned surface. In the preferred embodiment, the light source assembly includes a Gallium Nitride (GaN) based light emitting diode (LED) that emits blue source light and a light transmitting rod lens. The light transmitting rod lens is preferably a solid transparent structure, designed to receive the blue source light through one end of the rod and transmit a composite "white" light from the entire length of the rod, providing the desired linear illumination. The rod lens includes two fluorescent strips and a non-fluorescent strip, located near the exterior surface of the rod. The two fluorescent strips operate to absorb the blue source light and to emit red light and green light, while the non-fluorescent strip reflects the blue source light. The emitted red and green light, along with the reflected blue light, form the composite light that provides the linear illumination on the target surface.

20 Claims, 8 Drawing Sheets

LIGHT SOURCE ASSEMBLY FOR SCANNING DEVICES UTILIZING LIGHT EMITTING DIODES

TECHNICAL FIELD

The invention relates generally to scanning devices and more particularly to a light source assembly for a scanning device.

BACKGROUND ART

Scanning devices such as flat-bed color scanners and color copying machines operate by capturing light reflected from a scanned medium and using the captured light to reproduce images, graphics and/or text from the medium. In a typical scanning device, a light source assembly projects a thin, linear light pattern, that is reflected and then captured by a photo-sensing component. A common photo-sensing component of a scanning device is a charge-coupled device (CCD) having an array of photosensors positioned in a thin strip. The light source assembly is positioned adjacent to the CCD in order to effectuate the projection and capture of the linear light pattern. Depending upon the characteristics of the light being received by the CCD, the definition and color composition of the images, graphics and/or text on the medium can be determined. An entire surface of the medium can be scanned by moving the light source assembly and the CCD relative to the medium. Alternatively, the medium may be moved relative to the light source assembly and the CCD to provide scanning of the surface of the medium.

There are various types of conventional light source assemblies for scanning devices. A conventional light source assembly may include a fluorescent tube having a longitudinally extending aperture formed by removing one or more interior coatings along a lengthwise region of the bulb. A linear illumination is provided by the generated light that escapes from the fluorescent tube through the aperture. However, a more common type of light source assembly for scanning devices utilizes a transparent solid rod to receive light from an electric lamp and to transmit the received light in a direction perpendicular to the length of the rod and along the entire length of the rod to provide the linear illumination. These rod-type light source assemblies tend to be less bulky and require less power than the tube type light source assemblies.

U.S. Pat. No. 4,924,357 to Yamashita et al. discloses a light source assembly that utilizes the above-described rod for business machines, such as scanners and copying machines. The light source assembly of Yamashita et al. includes a lamp that is positioned at one end of a solid transparent rod to emit source light through the interior region of the rod in a lengthwise direction. Various lamps are disclosed that may be utilized in the light source assembly of Yamashita et al. A tungsten halogen lamp, a mercury lamp, a xenon lamp and a flash lamp are specifically identified as possible candidates for generating the light energy for the light source assembly. The rod is described as a solid light-transmitting rod having a circular or elliptical cross-section. Along the length of the rod, a strip of diffusion material is coated onto the outer surface of the rod. The entire rod is enclosed in an aluminum cylinder encasing, which has a slit along its length. The rod is positioned in the encasing such that the diffusion strip on the rod is located opposite to the slit. The diffusion strip operates to diffuse light from the lamp that is propagating through the interior region of the rod. In effect, the diffusion strip redirects the source light from the lamp, that is being reflected from the surface of the rod and the interior surface of the encasing, towards the slit in the encasing such that the redirected light can emanate from the entire length of the slit. The emission of light from the slit in the encasing provides a linear illumination.

A still more power-efficient light source assembly is described in U.S. Pat. No. 5,753,906 to Gennetten. The light source assembly of Gennetten utilizes light emitting diodes (LEDs) to provide the linear illumination. LEDs have a number of advantages over electrical lamps. For example, LEDs are less expensive and more compact than electrical lamps. In addition, LEDs operate at a significantly lower voltage that electrical lamps, while providing a stable geometrical light output, i.e., uniform illumination. The Gennetten light source assembly includes four different types of LEDs, wherein each type of LED is designed to emit light of a particular color. In one embodiment, the LEDs are positioned along a straight line in an alternating fashion. The LEDs are placed in groups of four LEDs, such that the same color LED will be present every fourth LED. In another embodiment, the LEDs form a 4×N array such that a row of N LEDs in the array is of one color. In either embodiment, the linearly distributed LEDs provide the linear illumination required for scanning devices.

Although the Gennetten light source assembly utilizes LEDs which have advantages over conventional lamps, the great number of LEDs that are required by the Gennetten light source assembly counterbalances some of the advantages. The Gennetten light source assembly may require tens of LEDs, whereas the Yamashita et al. light source assembly only requires a single lamp.

What is needed is a compact light source assembly for scanning devices that exploits some of the advantages of rod-type light source assemblies, while also taking advantage of the favorable properties of LEDs.

SUMMARY OF THE INVENTION

A light source assembly and method of providing illumination on a desired surface utilize a fluorescent material to generate composite "white" light from source light of a particular color, i.e., a particular wavelength. The invention takes advantage of fluorescence to provide the various color lights needed to form the desired composite light from the single color source light. The light source assembly is optimally designed for use in scanning devices, such as flat-bed color scanners, in which linear illumination is necessary to capture images, graphics and/or text from a target scanned surface.

The light source assembly includes a source light generator and a light transmitting rod. The source light generator is preferably a light emitting diode (LED). Although an LED that can emit violet or ultraviolet light may be utilized, a Gallium Nitride (GaN) based LED that emits blue light of high intensity is preferred, e.g., the LEDs manufactured by Nichia Chemical Industries, LTD., Tokyo, Japan. In an alternative configuration, the light source assembly employs two LEDs to supply the source light. The two LEDs are positioned adjacent to opposite ends of the light transmitting rod to emit the source light into the rod from both ends.

The light transmitting rod is preferably a solid transparent structure, designed to receive the source light from at least one end of the rod. The composition of the light transmitting rod allows the rod to be a propagation medium for the source light. The light transmitting rod may be composed of glass or plastic material, such as polystryrene, acrylic, or polycarbonate. The light transmitting rod includes at least one fluorescent strip, located near the exterior surface of the rod.

The fluorescent strip extends along the length of the rod. The fluorescent strip contains a fluorescent material having a property to absorb the source light and then to emit light of a different color. The fluorescent material may be an inorganic fluorescent dye or an organic fluorescent dye. In the preferred embodiment, organic dye is utilized to form the fluorescent strip by combining the organic dye, which is in a liquid state, with epoxy or other comparable material. The dye-epoxy compound is applied to the light transmitting rod to fabricate the fluorescent strip. In an alternative configuration, the organic dye is diffused into the light transmitting rod to form a region of fluorescent material along the length of the light transmitting rod.

In a first embodiment of the invention, the light transmitting rod includes one non-fluorescent and two fluorescent strips that are positioned parallel to one another along the length of the rod. A first fluorescent strip contains an organic dye that can absorb a blue source light and emit red light. A second fluorescent strip contains a different organic dye that can absorb the blue source light and emit green light. However, the non-fluorescent strip does not contain any organic dye. The non-fluorescent strip contains a diffusive material, such as barium sulfate, magnesia or titania, to reflect the blue source light. The emitted red and green lights, along with the reflected blue light, are focused within the light transmitting rod to a target scanned surface. The different color lights then emanate from the rod as a composite "white" light to provide illumination. The emanation occurs along the entire length of the light transmitting rod, creating the desired linear illumination.

In a second embodiment of the invention, the light transmitting rod includes a compound fluorescent strip that contains both organic dyes utilized in the first embodiment to absorb the blue source light and emit both red and green lights. Essentially, the two fluorescent strips of the first embodiment are integrated into a single strip to generate the red and green lights. The second embodiment also includes a non-fluorescent strip to reflect the blue source light to supply blue light to the composite light. The three color lights from the compound fluorescent strip and the non-fluorescent strip form the composite light and are transmitted from the light transmitting rod to a target scanned surface.

In either embodiment, the light transmitting rod is designed to function as a lens to focus the lights transmitted from the strips to the desired scanning surface. The light transmitting rod can have various shapes to accomplish the focusing function. The light transmitting rod may have a circular, a U-shaped, or an elliptical cross-section. However, the cross-sectional shape of the light transmitting rod is not critical to the invention.

An advantage of the invention is that an LED is employed to provide the source light. The use of the LED incorporates all the advantages of a solid state device over conventional electrical lamps into the invention, such as lower cost, stable geometrical light output, lower operating voltage and compactness.

Another advantage is that the blue source light and the red and green lights that are emitted from the organic dyes closely match the tristimulus values for the human eye, increasing the color quality of scanned images.

Still another advantage is that, unlike conventional light source assemblies utilizing LEDs, the invention requires a single LED, instead of tens of LEDs. The result is a compact light source assembly that is less expensive to manufacture. In addition, since only the single LED requires power, less energy is needed to operate the light source assembly.

DETAILED DESCRIPTION

Figure 1:
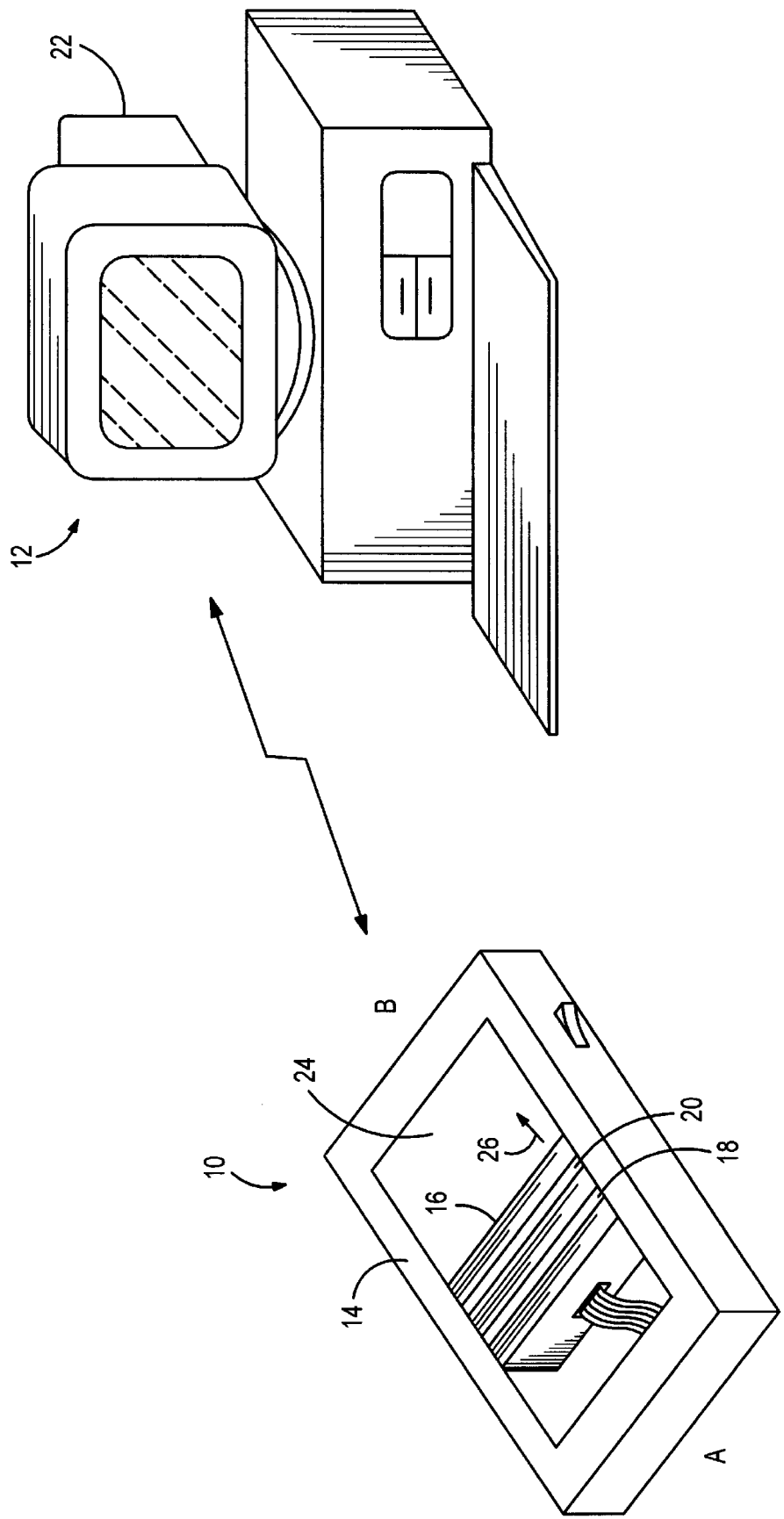
FIG. 1 is a perspective view of a scanning device embodying the present invention and an associated computer system.

With reference to FIG. 1, a flat-bed color scanner 10 embodying the invention is shown with an associated computer system 12. The scanner 10 includes a housing 14, and a carriage unit 16 which is contained within the housing. The carriage unit 16 is comprised of a light source assembly 18 and a photosensor 20. The light source assembly 18 and the photosensor 20 are designed to operate in unison to capture images, graphics and/or text (hereinafter collectively referred to as "images") from a surface of a medium, such as a sheet of paper. The light source assembly 18 provides illumination upon the surface of the medium to be scanned, while the photosensor 20 captures reflected light from the illuminated surface of the medium. The photosensor 20 may be a charge-coupled device (CCD) or other light sensing device. The captured light is then processed to reproduce the images from the surface of the medium. The reproduced images may be displayed on a monitor 22 of the computer system 12.

The maximum scanning area for the scanner 10 is defined by a rectangular opening 24 in the scanner 10. The opening 24 is covered by a glass, such that a sheet of paper that is to be scanned may be placed on the glass, above the carriage unit 16. During operation, the surface of the paper adjacent to the glass is scanned by the scanner 10. Except for the light source assembly 18, the scanner 10 is structurally and operationally identical to conventional scanners. The light source assembly 18 will be described in detail below.

In operation, a sheet of paper, or other medium, is placed on the glass within the scanning area. A scanner cover (not shown) is placed on top of the scanning area, positioning the paper between the glass and a cover. Preferably, a user controls the operation of the scanner 10 by utilizing software that is running on the computer system 12. The user is able to manipulate the functions of the scanner 10 by inputting commands into the computer system 12. The user initiates the scanning procedure by inputting an appropriate command. In response to the command, the carriage unit 16 begins to move in a direction designated by arrow 26. The carriage unit 16 is initially positioned near side A. During a scanning mode, the carriage unit 16 advances toward side B in order to scan the entire surface of the paper. As the carriage unit 16 passes under the paper, the light provided by the light source assembly 18 is reflected from the paper and is received by the photosensor 20.

The photosensor 20 generates electrical signals in response to the varying intensities of the received light. The electrical signals are then transmitted to the computer system 12 for processing. By calculating the intensities of the reflected light that is captured by the photosensor 20, the computer system 12 is able to reproduce the images on the paper. This reproduced image may be displayed on the monitor 22 of the computer system for editing and/or printing.

Figure 2:
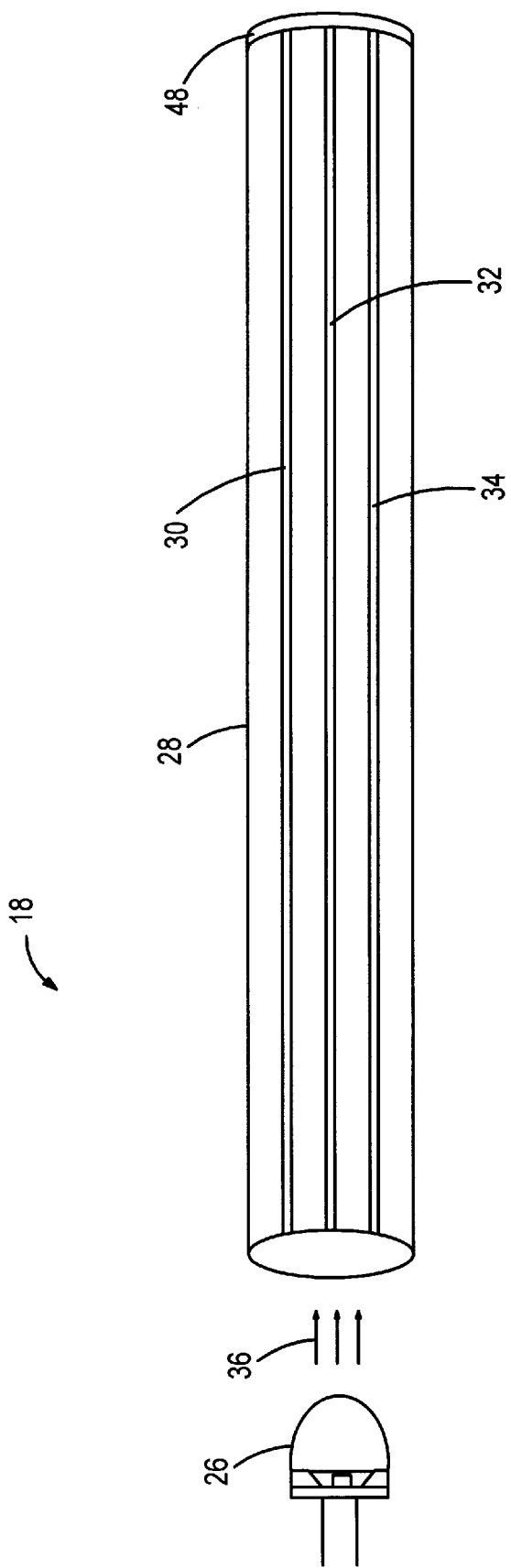
FIG. 2 is a bottom view of a light source assembly including a light emitting diode (LED) and a light transmitting rod lens in accordance with a first embodiment of the present invention.
Figure 3:
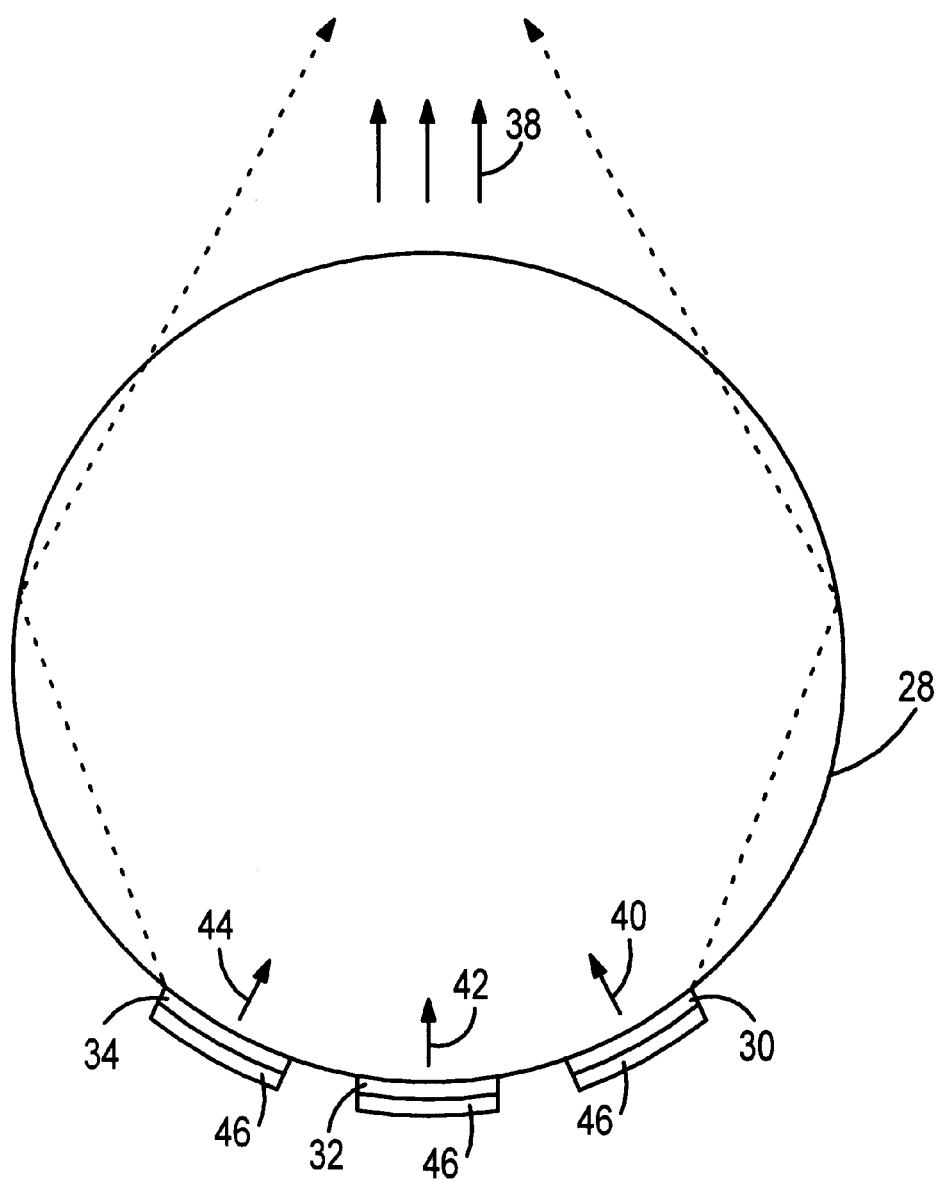
FIG. 3 is a cross-sectional view of the light transmitting rod lens of FIG. 2.

Turning to FIGS. 2 and 3, critical components of the light source assembly 18 of FIG. 1 in accordance with a first embodiment of the invention are shown. The critical components of the light source assembly 16 are a light emitting diode (LED) 26 and a light transmitting rod lens 28. FIG. 2 is a bottom view of the LED 26 and the rod lens 28. FIG. 3 is a cross-sectional view of the rod lens 28. Preferably, the LED 26 is a blue light emitting, Gallium Nitride (GaN) based LED. For example, the LED 26 may be an LED manufactured by Nichia Chemical Industries, LTD., Tokyo, Japan. Alternatively, the LED 26 may be an LED that emits violet or ultraviolet light. However, the operational feasibility for using one of these alternative types of LEDs will depend on the composition of the rod lens 28. For discussion below, the LED 26 will be assumed to be an LED that emits blue light when activated.

The light transmitting rod lens 28 is a solid cylindrical rod that is transparent, allowing light to propagate within the rod lens. The rod lens 28 may be composed of glass or plastic material, such as polystyrene, acrylic or polycarbonate. The rod lens 28 has a circular cross-section, as shown in FIG. 3. As will be described below, the rod lens 28 not only functions as a propagation conduit for light, but also functions as a lens. In this embodiment, two fluorescent strips 30 and 32 and a non-fluorescent strip 34 are present on the rod lens 28. The three strips 30, 32 and 34 operate to receive blue light 36 emitted from the LED 26 and then transmit composite "white" light 38, having components of red light 40, green light 42 and blue light 44. Although the strips 30, 32 and 34 are shown to be separated in FIGS. 2 and 3, the strips 30, 32 and 34 may be positioned immediately adjacent to each other, such that no space appears between the strips 30, 32 and 34.

In order to generate the composite light 38 from the emitted blue light 36, the fluorescent strips 30 and 32 contain fluorescent material to convert the emitted blue light 36 into the red light 40 and the green light 42. The fluorescent strip 30 contains a first fluorescent material that can absorb the emitted blue light 38 and emit the red light 40, while the fluorescent strip 30 contains fluorescent material that can emit green light 42 in response to the emitted blue light 36. However, the non-fluorescent strip 34 does not contain any fluorescent material. The non-fluorescent strip 34 operates to reflect the emitted blue light 36 in order to supply the blue light 44 to form the composite light 38.

The fluorescent material contained in the fluorescent strips 30 and 32 may be inorganic dyes or organic dyes. The inorganic dyes are typically in a solid form, as powders. However, the organic dyes are typically in a liquid form. Preferably, the organic dyes are utilized to fabricate the fluorescent strips 30 and 32. The fabrication process of the fluorescent strips 30 and 32 includes combining a selected organic dye with epoxy or other comparable bonding material to form a fluorescent paste. The selected organic dye will determine whether the fluorescent paste will be used to form the fluorescent strip 30 or the fluorescent strip 32. The fluorescent paste is applied to the exterior surface of the rod lens 28, along the length of the rod lens 28, in order to form one of the fluorescent strips 30 and 32.

As an example, the organic dyes utilized in the fluorescent strips 30 and 32 may be dyes from Lambda Physik, Inc. located in Fort Lauderdale, Fla. For example, an organic dye sold under the name of "Pyridine 1" may be utilized to fabricate the fluorescent strip 30, while an organic dye sold under the name of "Coumarin 6" may be utilized to fabricate the fluorescent strip 32. The selection of the organic dye will depend on the desired output color light from a particular input color light. In the above examples, Pyridine 1 emits red light when subjected to blue light. However, Coumarin 6 emits green light when subjected to the same blue light. Besides the dyes from Lambda Physik, Inc., other organic fluorescent dyes that are currently available in the market may be utilized in the fluorescent strips 30 and 32.

The non-fluorescent strip 34 contains diffusive material, such as barium sulfate, magnesia, titania or other comparable material to diffuse and reflect the emitted blue light 36. The diffusive material may also be combined with epoxy or other comparable bonding material into a paste and applied to the rod lens 28 in order to fabricate the non-fluorescent strip 34.

Affixed over the strips 30, 32 and 34 are reflectors 46. In addition, a reflector 48 is located over one end of the rod lens 28. The reflectors 46 and 48 may be composed of silver or aluminum. The reflectors 46 function to reflect any light that has propagated through one of the strips 30, 32 and 34, such that the light may be redirected toward a desired direction, i.e., the direction of the composite light 38. For simplification, the reflectors 46 are not illustrated in FIG. 2. The reflector 48 reflects light that has reached the end of the rod lens 28 back toward the LED 26, so that some of the reflected light can be integrated into the composite light 38, increasing the intensity of the composite light and the efficiency of the assembly.

In operation, the LED 26 is initially activated to emit the blue source light 36. The emitted blue light 36 enters the rod lens 28 through the adjacent end of the rod lens. As the blue light 36 propagates along the length of the rod lens 28, some of the blue light 36 impinges upon the strips 30, 32 and 34. The emitted blue light 36 that impinges upon the non-fluorescent strip 34 is reflected as blue light 44. The reflected blue light 44 is focused by the rod lens 28 and is transmitted from the rod lens 28 in a direction generally opposite to the non-fluorescent strip 34, thereby becoming a blue light component of the composite light 38, as shown in FIG. 3. The emitted blue light 36 that impinges upon the fluorescent strip 30 is absorbed by the fluorescent material contained within the strip 30. The fluorescent material becomes excited and emits the red light 40 through a process known as fluorescence. Similarly, the emitted blue light 36 that impinges upon the fluorescent strip 32 is absorbed by the fluorescent material contained within the fluorescent strip 32. However, the fluorescent material of strip 32 emits the green light 42 in response to the emitted blue light 36. The red and green lights 40 and 42 are also focused and transmitted from the rod lens 28 to become red and green components of the composite light 38. The composite light 38 emanates from the entire length of the rod lens 28, since the color lights 40, 42 and 44 are being emitted along the strips 30, 32 and 34. Therefore, the composite light 38 provides the desired linear illumination on a scanning surface.

The amount of red, green and blue light components of the composite light 38 is proportionally related to the surface area of the strips 30, 32 and 34. Therefore, the amount of a particular color component of the composite light 38 can be increased by widening the width of a corresponding strip. For example, if a greater amount of red light is desired, the fluorescent strip 30 can be widened to supply additional red light to the composite light 38. Conversely, decreasing the width of a strip has the opposite effect. By manipulating the red, green and blue light components, the composite light 38 can be manipulated to better match the tristimulus values for the human eye, increasing the color quality of reproduced images.

Figure 4:
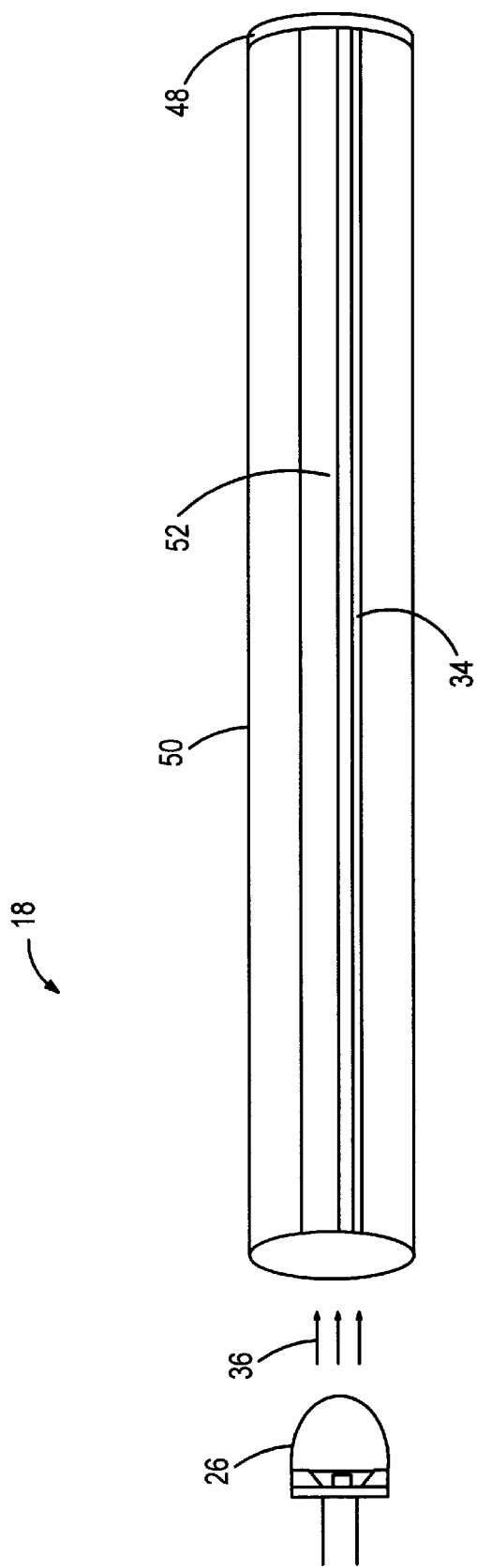
FIG. 4 is a bottom view of a light source assembly including an LED and a light transmitting rod lens in accordance with a second embodiment of the present invention.
Figure 5:
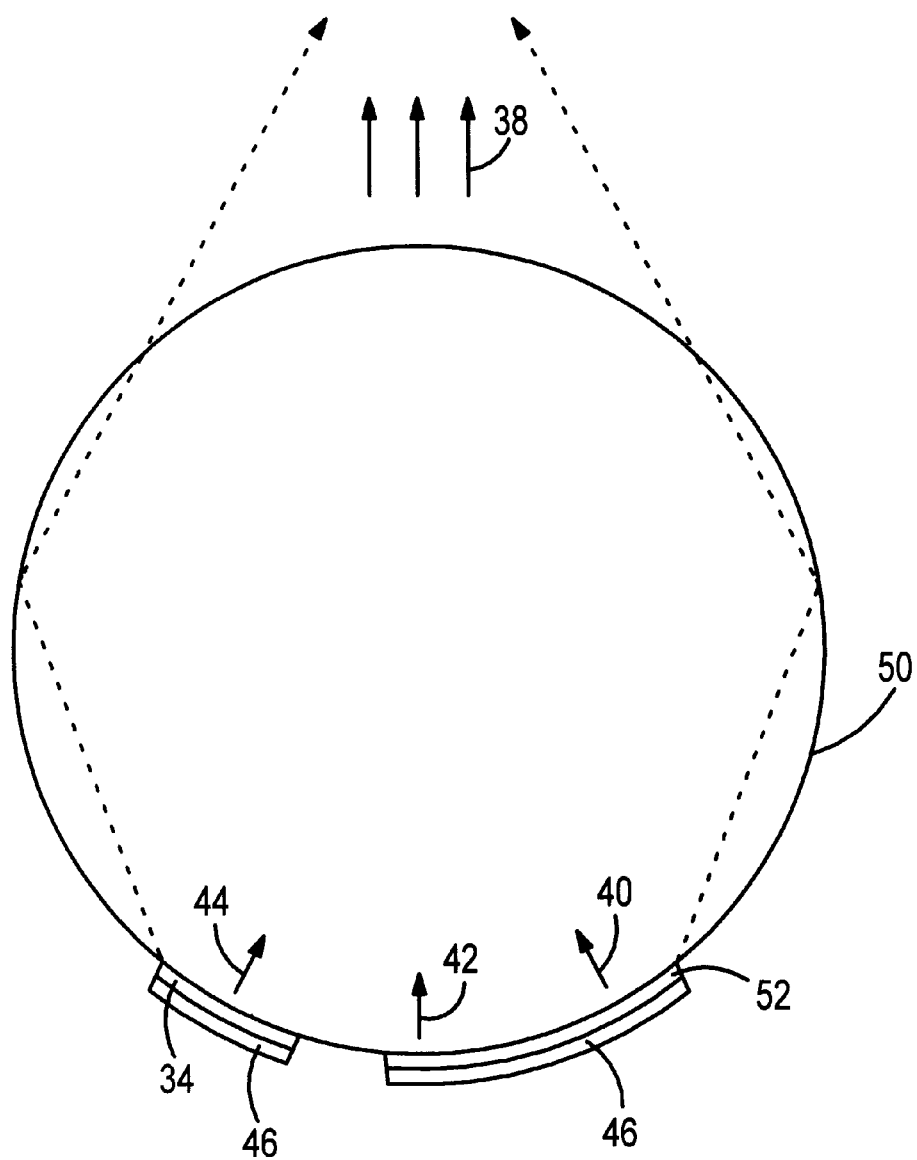
FIG. 5 is a cross-sectional view of the light transmitting rod lens of FIG. 4.

Referring now to FIGS. 4 and 5, a light transmitting rod lens 50 in accordance with a second embodiment of the invention is shown. FIG. 4 is a bottom view of the rod lens 50. FIG. 5 is a cross-sectional view of the rod lens 50. When applicable, the same reference numerals of FIGS. 2 and 3 will be used. The rod lens 50 is virtually identical to the rod lens 28 of FIGS. 2 and 3. The only substantive difference between the rod lens 50 and the rod lens 28 is that the rod lens 50 includes a single fluorescent strip 52, which essentially replaces the strips 30 and 32 of the rod lens 28. The fluorescent strip 52 is comprised of organic dyes that were utilized in the strips 30 and 32. For example, the fluorescent strip 52 may contain a mixture of Pyridine 1 and Coumarin 6. The fluorescent strip 52 operates to generate the red and green lights 40 and 42 from the emitted blue light 36. The blue light component of the composite light 38 is provided by the non-fluorescent strip 34.

The fluorescent strip 52 may be fabricated and affixed to the rod lens 50 in the same manner as the strips 30 and 32 of the rod lens 28. A mixture of organic dyes may be bonded together by epoxy or other comparable bonding material to form a paste. The proportions of organic dyes may vary in the mixture depending on the amount of a particular color desired in the composite light 38. For example, if more red light component is desired, the mixture may include more Pyridine than Coumarin 6. The paste is then applied to the exterior surface of the rod lens 50 to form the fluorescent strip 52.

In operation, the LED 26 is activated to emit the blue source light 36. The emitted blue light 36 propagates through the adjacent end of the rod lens 50. Within the rod lens 50, portions of the emitted blue light 36 impinge upon the fluorescent strip 52 and the non-fluorescent strip 34. Some of the emitted light that impinges upon the non-fluorescent strip 34 is reflected as the blue light 44. However, some of the emitted blue light 36 that impinges upon the fluorescent strip 52 is absorbed by the fluorescent material of the strip 52. Since the strip contains two types of fluorescent material, the fluorescent strip 52 emits both the red light 40 and the green light 42. The red, green and blue lights 40, 42 and 44 are focused by the rod lens 50 and then transmitted from the rod lens 50 to become components of the composite light 38. Light that reaches the other end of the rod lens 50 or travels through one of the strips 34 and 52 is reflected by the reflectors 48 and 46, respectively.

Alternative configurations for the light source assembly 18 having rod lens 28 or the rod lens 50 are contemplated. A first alternative configuration includes a second LED located near the opposite end of the rod lens 28 or 50 from the LED 26 and the removal of the reflector 48 from the rod lens 28 or 50. In this alternative configuration, the LED 26 and the second LED will both emit blue light into the rod lens 28 or 50, increasing the intensity of the resulting composite light.

A second alternative configuration relates to the fluorescent strips utilized in the various rod lenses. Instead of applying the fluorescent material as a coating onto the exterior surfaces of the rod lens, the liquid organic dyes are diffused into the interior region near the surface of the rod lens. In order to implement this configuration, the rod lens is preferably composed of a plastic material. The region of the rod lens diffused by the organic dyes can be a long strip-like area near the exterior surface of the rod lens. This region containing the organic dyes can function as one of the fluorescent strips 30, 32 and 52.

A third alternative configuration involves utilizing a rod lens having a U-shaped cross-section or an elliptical cross-section. These different cross-sections facilitate the focusing function of the rod lens. However, the overall operation of the invention does not differ in either of these alternative embodiments. The two alternative cross-sections for a rod lens are illustrated in FIGS. 6 and 7.

Figure 6:
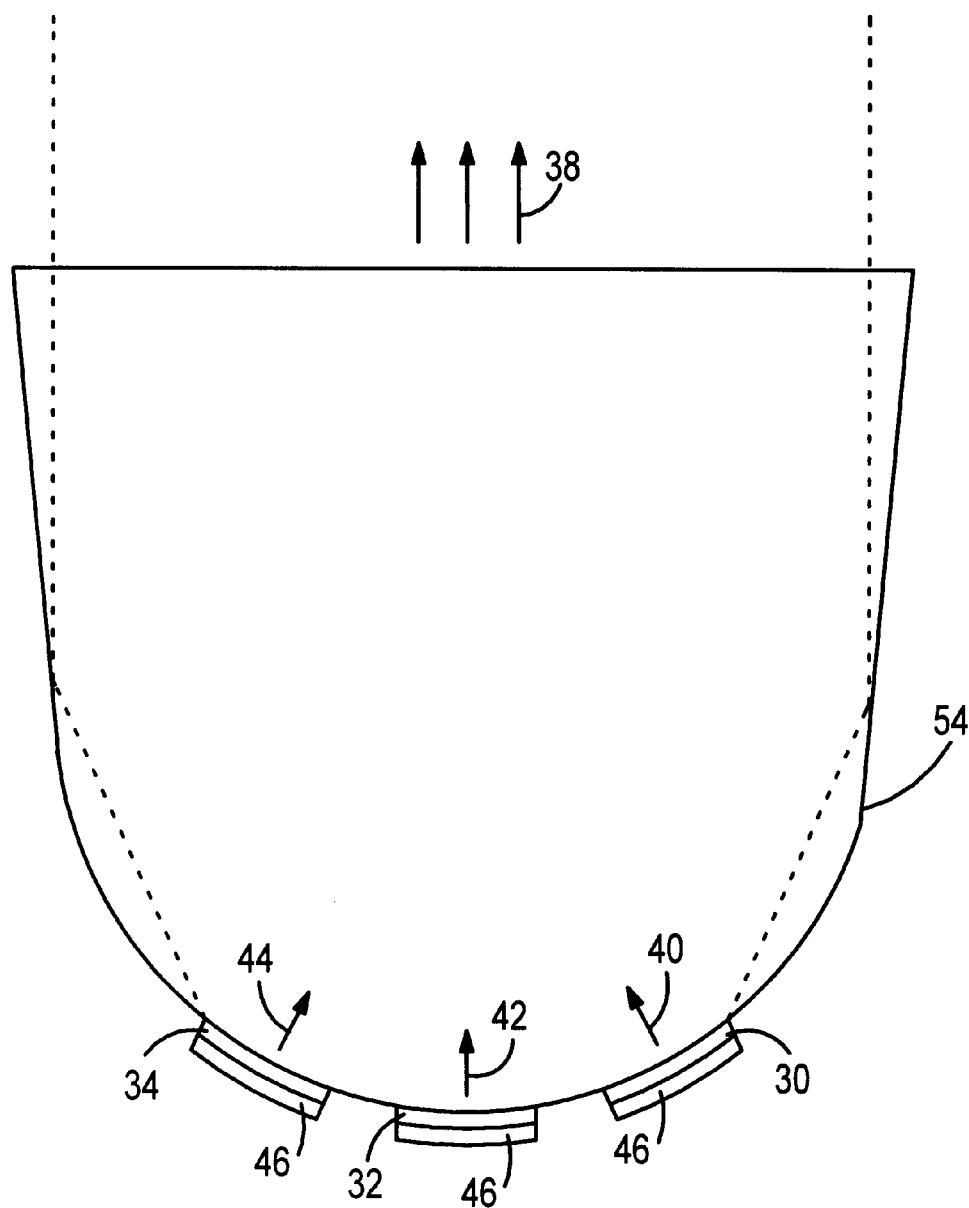
FIG. 6 is a cross-sectional view of a light transmitting rod lens having a U-shaped cross-section in accordance with a first alternative embodiment of the present invention.
Figure 7:
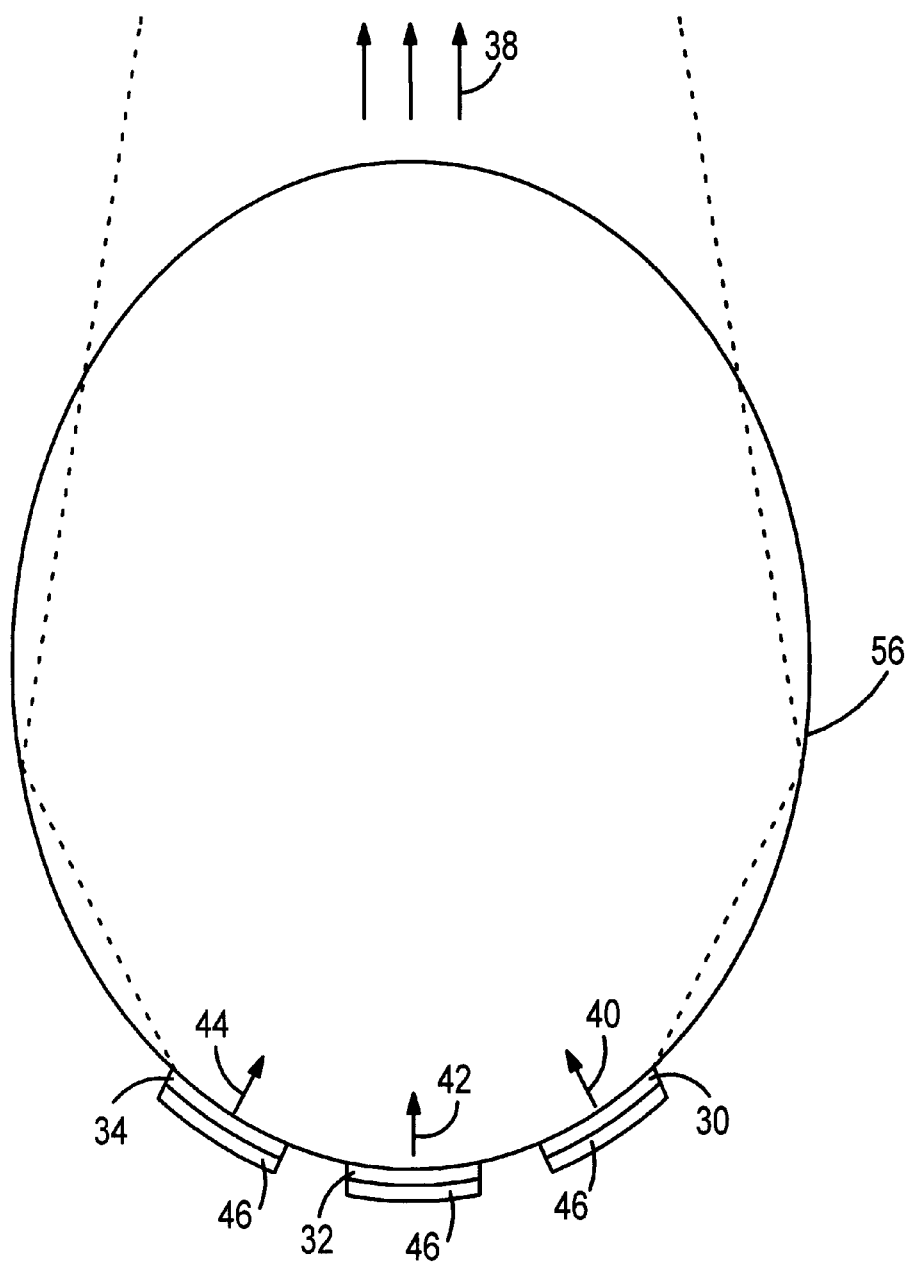
FIG. 7 is a cross-sectional view of a light transmitting rod lens having an elliptical cross-section in accordance with a second alternative embodiment of the present invention.

In FIG. 6, a cross-sectional view of a U-shaped rod lens 54 in accordance with a first alternative embodiment of the invention is shown. A cross-sectional view of an elliptical rod lens 56 in accordance with a second alternative embodiment of the invention is shown in FIG. 7. Both rod lenses 54 and 56 are shown to include the strips 30, 32 and 34 that are attached to the reflectors 46. However, the strips 30 and 32 may be replaced with the fluorescent strip 52 of FIGS. 4 and 5. The cross-sectional shapes of the rod lenses 54 and 56 focus the different color lights 40, 42 and 44 to form the composite light 38, which then illuminates a desired linear portion of a scanned surface.

Figure 8:
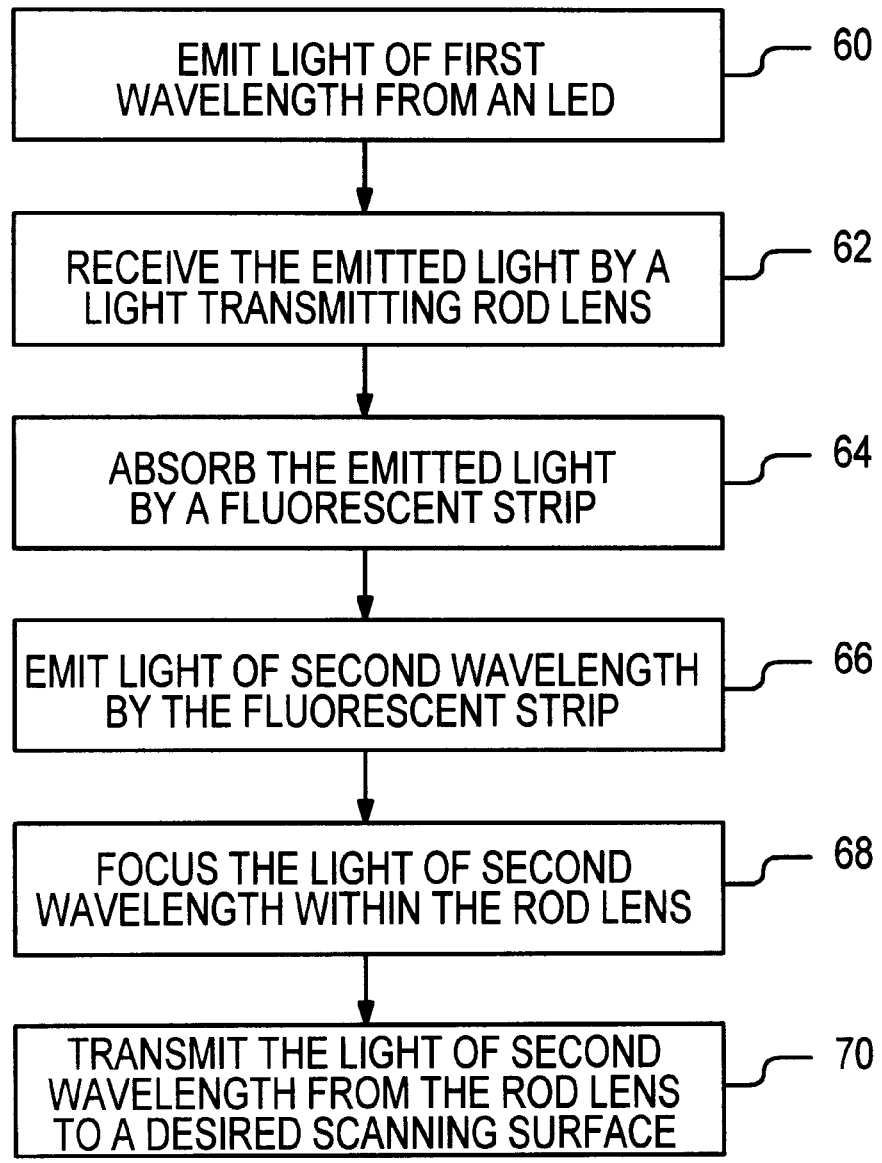
FIG. 8 is a flow chart of a method of providing linear illumination in scanning devices in accordance with the present invention.

A method of providing linear illumination in scanning devices in accordance with the invention will be described with reference to FIG. 8. At step 60, light of a first wavelength is emitted by a LED. Preferably, the LED is a Gallium Nitride (GaN) based LED that is designed to emit blue light. The emitted light of the first wavelength is then received by a light transmitting rod lens at step 62. Preferably, the emitted light enters the rod lens through one end of the rod lens. At step 64, the emitted light is absorbed by a fluorescent strip on the rod lens. Next, at step 66, light of a second wavelength is emitted by the fluorescent strip through fluorescence. The light of the second wavelength is then focused within the rod lens at step 68. The cross-sectional shape of the rod lens allows the light of the second wavelength to be focused. At step 70, the light of the second wavelength is transmitted from the rod lens to a target surface.

What is claimed is:

1. A light source assembly for scanning devices comprising:

generating means for emitting light of a first center wavelength, said light of said first center wavelength being a first component of a composite light;

an elongated structure having a first port on an exterior surface, said first port being optically coupled to said generating means to receive said light of said first center wavelength from said generating means, said exterior surface defining an interior region of said elongated structure to provide a propagation conduit for said light of said first center wavelength, said elongated structure having a second port along a length of said elongated structure;

a first fluorescent material operationally associated with said elongated structure, said fluorescent material being distributed generally along a length-wise direction of said elongated structure, said fluorescent material having a property to absorb said light of said first center wavelength and emit light of a second center wavelength, said light of said second center wavelength being a second component of said composite ligh; and a second fluorescent material located near said exterior surface of said elongated structure, said second fluorescent material being distributed generally parallel to said first fluorescent material, said second fluorescent material having a property to absorb said light of said first center wavelength and emit light of a third center wavelength, said light of said third center wavelength being a third component of said composite light, said composite light being a generally white light;

wherein said second port of said elongated structure is positioned and oriented to simultaneously direct and focus said first, second and third components of said composite light away from said elongated structure and toward a target surface.

2. The light source assembly of claim 1 wherein said generating means is a light emitting diode positioned adjacent to said first port of said elongated structure to emit said light of said first center wavelength to said interior region via said first port.

3. The light source assembly of claim 2 wherein said light emitting diode (LED) is a Gallium Nitride (GaN) based LED, said GaN based LED configured to emit said light of said first center wavelength wherein said first center wavelength is within a blue region of a visible light spectrum.

4. The light source assembly of claim 1 wherein said first and second fluorescent materials are fluorescent organic dyes.

5. The light source assembly of claim 1 further comprising a diffusive material on said exterior surface of said elongated structure, said diffusive material being distributed generally parallel to said first and second fluorescent materials.

6. The light source assembly of claim 1 wherein said elongated structure is a solid rod composed of a transparent material, said transparent material providing a propagation medium for said light of said first center wavelength within said elongated structure.

7. The lights source of claim 6 wherein said solid rod has a generally circular cross-section, said second port and said first fluorescent material having centers spaced apart by approximately 180 degrees along said generally circular cross-section.

8. The light source assembly of claim 6 wherein said solid rod has a U-shaped cross-section, said fluorescent materials being located near a bottom of said U-shaped cross-section and said second port being located on a top of said U-shaped cross-section.

9. The light source assembly of claim 6 wherein said first and second fluorescent materials are diffused into said solid rod, thereby forming fluorescent regions within said solid rod.

10. A light source assembly for a scanning device comprising:

a light source configured to emit light of a first center wavelength;

a solid transparent rod having a first port at one end operatively associated with said light source to receive said light of said first center wavelength, said solid transparent rod having a second port along a length of said solid transparent rod directed to transmit light to a target surface; and fluorescent means operatively associated with said length of said solid transparent rod for fluorescing light having at least one component with a center wavelength significantly different than said first center wavelength, said fluorescent means being responsive to said light of said first center wavelength propagating through said solid transparent rod, said second port being positioned to simultaneously release and focus said light of said first center wavelength and said light from said fluorescent means onto said target surface.

11. The light source assembly of claim 10 further comprising means for attaching said light source and said solid transparent rod for movement relative to said target scanned surface.

12. The light source assembly of claim 10 wherein said fluorescent means includes at least one organic fluorescent dye responsive to said light of said first center wavelength.

13. The light source assembly of claim 10 wherein said light source is a light emitting diode.

14. The light source assembly of claim 13 wherein said light emitting diode (LED) is a Gallium Nitride (GaN) based LED configured to emit blue light.

15. The light source assembly of claim 10 wherein said solid transparent rod is made of a plastic material and wherein said flourescent means includes at least one fluorescent material diffused into said solid transparent rod along said length.

16. A method of providing illumination on a scanned surface comprising steps of:

emitting light of a first center wavelength from a light source;

receiving said light of said first center wavelength through a port at one end of an elongated rod, said elongated rod being transparent to allow said light of said first center wavelength to propagate within said elongated rod;

absorbing at least some of said light of said first center wavelength by a fluorescent material located near an outer surface of said elongated rod, said fluorescent material being distributed generally along a lengthwise direction of said elongated rod;

emitting light of a second center wavelength by said fluorescent material in response to an absorption of said light of said first center wavelength; and simultaneously transmitting said light of said first and said second center wavelengths in a common direction away from said elongated rod and toward a target surface.

17. The method of claim 16 wherein said step of emitting said light of said first center wavelength includes employing a light emitting diode to generate said light of said first center wavelength.

18. The method of claim 16 wherein said step of emitting said light of said first center wavelength includes employing a Gallium Nitride (GaN) based light emitting diode to generate said light within a blue region of a visible light spectrum.

19. The method of claim 16 further comprising steps of:

absorbing at least some of said light of said first center wavelength by a second fluorescent material located near said outer surface of said elongated rod, said second fluorescent material being distributed generally along said lengthwise direction of said elongated rod; and emitting light of a third center wavelength by said second fluorescent material in response to an absorption of said light of said first center wavelength by said second fluorescent material.

20. The method of claim 16 further comprising a step of focusing said light of said first and said second center wavelengths within said elongated rod prior to said step of transmitting said light of said first and said second center wavelengths.

* * * * *